United States Patent
Lele et al.

(10) Patent No.: US 6,316,585 B1
(45) Date of Patent: Nov. 13, 2001

(54) PROCESS FOR THE PREPARATION OF ENZYMATICALLY DEGRADABLE POLYMERS

(75) Inventors: Bhalchandra Shripad Lele; Turumella Padmaja; Mohan Gopalkrishna Kulkarni, all of Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/488,040

(22) Filed: Jan. 19, 2000

(30) Foreign Application Priority Data

Jan. 18, 1999 (IN) ............................................ 101/99

(51) Int. Cl.⁷ ............................ C08G 69/08; C08K 5/16
(52) U.S. Cl. ................. 528/292; 528/272; 528/335; 524/186; 524/195; 524/221; 524/233
(58) Field of Search ............................. 528/272, 292, 528/335; 524/186, 195, 221, 233

(56) References Cited

U.S. PATENT DOCUMENTS 4,318,905 * 3/1982 Nestor et al. .......................... 424/177

* cited by examiner

*Primary Examiner*—Samuel A. Acquah
(74) *Attorney, Agent, or Firm*—Birch, Stewart, Kolasch & Birch, LLP

(57) ABSTRACT

The present invention relates to the preparation of enzymatically degradable polymers, having repeating structural unit as shown hereinbelow:

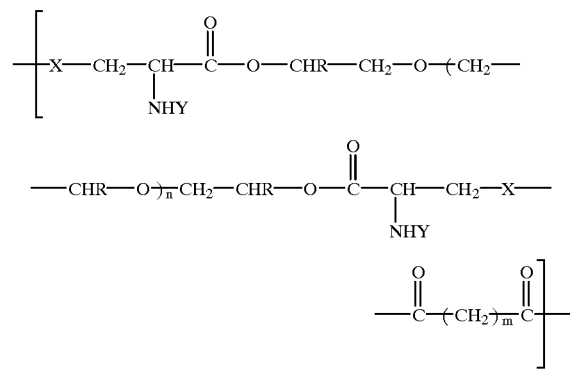

Figure 1:
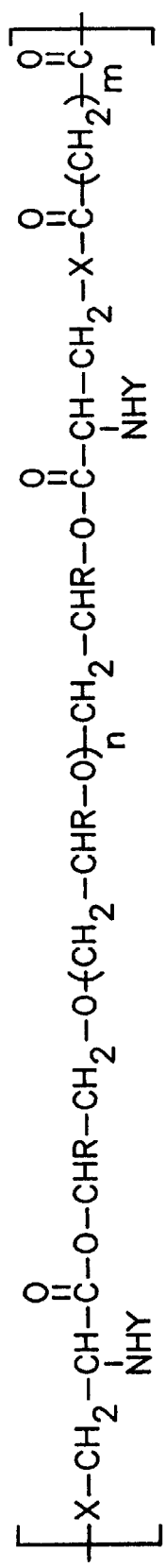

X—is selected from phenolic —OH of tyrosine, —OH of serine and threonine and —SH of cysteine Y—is pendant group selected from drug molecules containing carboxyl groups, R—is hydrogen, methyl or mixture of hydrogen and methyl on the individual molecule, n—is an integer from 0 to about 100, and m—is an integer from 0 to 10, the said process comprises the steps of reacting diester of poly (oxyalkylene glycol) and hydrochloride of trifunctional amino acid with a dicarboxylic acid in the presence of a condensing agent in a solvent at a temperature in the range of 0° C. to room temperature for a period ranging between 1 hr to 24 hrs, neutralizing the hydrochloride salt by base, and reacting the free amino groups in the side chain of the polymer with the drug molecule containing carboxyl groups to obtain enzymatically degradable polymer.

13 Claims, 2 Drawing Sheets

Polymeric Drugs

Polymeric Drugs

ENZYMATIC DEGRADATION OF POLYMERS

PROCESS FOR THE PREPARATION OF ENZYMATICALLY DEGRADABLE POLYMERS

FIELD

This invention relates to a process of preparation of enzymatically degradable polymers. This invention particularly relates to a process for preparation of poly (ester) prodrugs by polycondensation of dicarboxylic acids with diesters of poly (oxyalkylene glycol) and trifunctional amino acid hydrochloride, in the presence of a condensing agent. More particularly, it relates to a process for the preparation of enzymatically degradable polymeric pro-drugs having repeating structural unit according to FIG. 1 as shown in the drawing accompanying this specification, wherein, X is selected from phenolic —OH of tyrosine, —OH of serine and threonine, and —SH of cysteine, Y is pendant group selected from drug molecules containing carboxyl groups, R is hydrogen, methyl or mixture of hydrogen and methyl on the individual molecule, n is an integer from 0 to about 100 and m is an integer from 0 to 10.

BACKGROUND

Water soluble polymeric prodrugs have been extensively investigated as they can provide site specific drug delivery, longevity in blood circulation, lower drug dosage levels, bicompatibility and biodegradability (R. Duncan, J. Kopecek, Adv. Polym. Sci. 57, 51 (1984), P. Sinko and J. Kohn, "Polymeric Drug Delivery Systems" In: Polymeric Delivery Systems, M. A. El-Nokaly, D. M. Piatt, B. A. Charpentier, Eds. ACS Symposium series 520, American Chemical Society, Washington, D.C., P.18–42 (1993)). Due to immunogenic nature of poly(α amino acid)s researchers have developed various synthetic polymeric prodrugs as alternatives. These can broadly be classified into two types, 1) bidcompatible prodrugs and 2) biodegradable prodrugs.

Some of the biocompatible polymeric prodrug systems developed are poly (methacrylic acid—co—2(methyl sulfinyl) ethyl methacrylate) (P. Moltz, Int. J Biol. Macromol. 2, 245 (1980)), poly (methacrylic acid—co—N-2 (hydroxypropyl) methacrylamide) and poly (N-vinyl pyrrolidone—co—vinyl amine) (V. Hoffman, H. Ringsdorf, A. Seganova, Macromol. Chem. 180, 837 (1979), R. Duncan, J. Kopecek, P. Rajmanova, J. B. Lloyed, Biochem, Biophys. Acta 755, 518 (1983)). Various drug molecules such as chlorambucil, daunomycin, bis (2 chloroethyl) amine etc. were chemically linked to these polymers and prodrugs so synthesized were evaluated.

Prodrugs based on high molecular weight poly (ethylene glycol)s and poly (oxyethylene dicarboxylic acid)s have also been developed (T. Ouchi, Y. Hagihara, K. Takahashi, Y. Takano, I. Igarashi, Drug Design and Disceovery 9, 93 (1992), R. B. Greenwald, C. W. Gilbert, A. Pendri, C. D. Conover, J. Xia, A. Martinez, J. Med. Chem. 39,424 (1996)). Although these polymers are biocompatible, they are not biodegradable. Thus, they tend to accumulate in body after the delivery of attached drug molecule (R. Duncan, J. Kopecek Adv. Polym. Sci. 57, 51 (1984). Therefore, biodegradable prodrugs are preferred over biocompatible ones.

Polymers based on low molecular weight poly (ethylene glycol) and various trifunctional amino acids are being investigated as biodegradable prodrugs because the pendant functional groups in such polymers can be used for chemical linkage of drug molecules. Kohn et al (1992) reported water-soluble poly (ether-urethane) based on L-lysine and poly (ethylene glycol). The polymer was synthesize by the reaction of L-lysine ethyl ester with bis (succinimidyl) carbonate derivative poly (ethylene glycol). The polymer so synthesized was treated with sodium hydroxide in order to de-block the side chain carboxyl groups of L-lysine and make them available for drug linkage. (A. Nathan, D. Bolika, N. Vyavahare, S. Zalipsky, J. Kohn, Macromolecules 25, 4476 (1992)). Ulbrich et al (1997) reported a prodrug system based on poly (oxyethylene glycol) and L-glutanic acid. This polymer was synthesized by connecting two blocks of monomethoxy poly (oxyethylene) carboxylic acid via biodegradable oligopeptide-1,4 bis (γ-para-nitroanilido glutamido) ethylene diamide (M. Pechar, J. Strohalm, K. Ulbrich, Macromol. Chem. 198, 1009 (1997)). The oligopeptide was synthesized following standard procedures of blocking and de-blocking of —NH$_2$ and —COOH groups of amino acid. Won et al (1998) reported a polymer based on poly (ethylene glycol) and L-aspartic acid. In this, N-benzyloxylcarbonyl L-aspartic acid (N-cbz-L-aspartic acid) was converted into N-cbz-aspartic anhydride by the reaction of thionyl chloride. Subsequently, N-cbz-aspartic anhydride was reacted with poly (ethylene glycol) to obtain a polymer with blocked —NH$_2$ groups. This polymer was treated with 1,4 cyclohexadiene and Palladium/activated charcoal in order to de-block —NH$_2$ groups and make them available for drug linkage (C-Y Won, C-C chu J. D. Lee, J. Polym. Sci. Chem. Ed. 36, 2949 (1998).

Thus, due to such tedious blocking and de-blocking procedures of —NH$_2$ and —COOH groups, a very few examples (mentioned herein above) of prodrugs based on trifunctional amino acids and poly (ethylene glycol) are reported so far.

OBJECTS

It is, therefore, an object of the present invention to provide a simpler process for the preparation of novel water soluble polymeric prodrug systems based on poly (oxyalkylene glycol) and trifunctional amino acids, which will eliminate the conventional blocking and de-blocking chemistry of —NH$_2$ group.

It is also an object to provide a process applicable to various trifunctional amino acids.

Another object is to provide enzymatically degradable polymers, which polymers are stable and degrade only in the presence of certain enzymes, depending upon the amino acid present in the polymer, thus providing means of developing site specific drug delivery systems. Polymers based on poly (oxyalkylene glycol) and amino acids are suitable for this purpose.

DETAILED DESCRIPTION

Accordingly, the present invention provides a novel process for the preparation of condensation polymers based on dicarboxylic acids and diesters of poly (oxyalkylene glycol) and amino acid hydrochlorides. The main advantage of this novel process over the conventional processes is that it eliminates the use of —NH$_2$ blocking groups namely N-benzyloxycarbonyl (N-cbz) and N-tertiarybutyloxycarbonyl (N-tboc) and the subsequent tedious procedures of de-blocking viz. hydrogenation or reaction with 1,4 cyclohexadiene/Palladium/Charcoal and the acid hydrolysis respectively. The drug linkage to the polymers synthesized by the process of the invention is much simpler as this involves only neutralization of hydrochloride salts by the treatment of commonly used bases.

Also, the polymers synthesized by following the process of the present invention are novel.

Accordingly, the present invention provides a process for the preparation of enzymatically degradable polymers, having repeating structural unit in the formula hereinbelow:

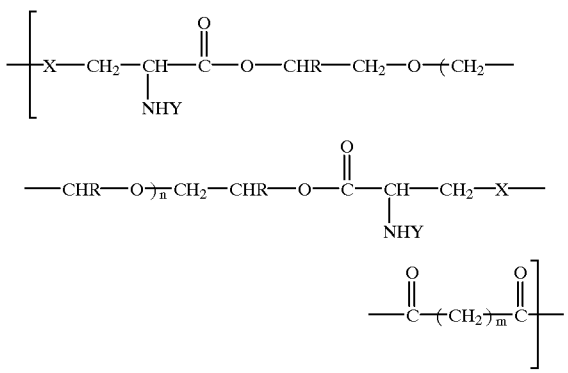

wherein, X is selected from phenolic —OH of tyrosine, —OH of serine aid threonine and —SH of cysteine, Y is the pendant group selected from drug molecules containing carboxyl groups, R is hydrogen, methyl or mixture of hydrogen and methyl on the individual molecule, n is an integer from 0 to about 100 and m is an integer from 0 to 10, which process comprises the steps of:
- (i) reacting diester of poly (oxyalkylene glycol) and hydrochloride of trifunctional amino acid with a dicarboxylic acid in the presence of a condensing agent in a solvent at a temperature in the range of 0° C. to room temperature for a period ranging between 1 hr to 24 hrs,
- (ii) neutralizing the hydrochloride salt using a base, and
- (iii) reacting the free side chain amino groups of the polymer with drug molecule containing carboxyl groups to obtain the desired enzymatically degradable polymer.

In an embodiment, the diesters of poly (oxyalkylene glycol) is selected from the group comprising compounds of the formula HOCH$_2$—CHR—(CH$_2$—CHR—O—)$_n$—CH$_2$—CHR—OH wherein R is hydrogen, methyl or mixture of hydrogen and methyl on the individual molecule, n is an integer which represents the average number of oxyalkylene groups, preferably from 0 to 100.

In yet another embodiment, the glycol is selected from the group of compounds having formula HO—(CH$_2$)$_l$—OH wherein l is an integer from 0 to 12.

In another embodiment, the amino acid are selected from the group trifunctional amino acids comprising tyrosine, serine, threonine, cysteine.

In yet another embodiment, the hydrochlorides of the trifunctional aminoacids are prepared by treating the amino acids with hydrochloric acid.

In a further embodiment, the dicarboxylic acid is selected from the group of compounds of the formula HOOC—(CH$_2$—)$_m$—COOH wherein m is an integer from 0 to 10.

In a further embodiment, the unsaturated dicarboxylic acid is selected from itacoinc acid and fumaric acid.

In still another embodiment, the condensing agent is selected from the group of carbodiimides comprising dicyclohexyl carbodiimde, diisopropyl carbodiimde.

In another embodiment, the solvent is selected from the group comprising acetonitrile, tetrahydrofuran, dioxane, dimethyl formamide.

In another embodiment, the base used for neutralization of hydrochloride salt is selected from triethylamine, tributylarnine, sodium bicarbonate.

In another embodiment, the pendant group Y is selected from the group of drug molecules containing carboxyl group such as benzoic acid and methotrexate.

In a feature, the process is typically carried out under, mild conditions. Stoichiometric amounts of poly (oxyalkylene glycol) and amino acid hydrochloride are dissolved in a solvent and stoichiometric amount of a carbodiimde is added and the reaction mixture is stirred at room temperature for 12 hrs. After this, the reaction mixture is filtered to remove the urea salts formed due to condensation reaction. The clear solution containing diester of poly (oxyalkylene glycol) and amino acid hydrochloride is then poured into another solvent which is nonsolvent for the diester. Precipitated diester is then isolated.

In another feature, appropriate amounts of the diester so synthesized and dicarboxylic acid are dissolved in a solvent and appropriate amount of a carbodiimde is added. The reaction mixture is stirred at room temperature for 12 hrs. and filtered to remove urea salts. Clear solution containing the polymer is then poured into another solvent which is a nonsolvent for the polymer. Precipitated polymer is then isolated.

In another feature, the polymer so synthesized is dissolved in a solvent and protected amino groups in the polymer are then freed from hydrochloride by the treatment of a base. Then acid chloride of a drug molecule is added and the reaction mixture is stirred at room temperature for 12 hrs for chemical linkage of drug molecules with pendant amino groups. The reaction mixture is then filtered to remove salts and the clear solution containing prodrug is poured into another solvent which is, a nonsolvent for the prodrug. Precipitated prodrug is then isolated.

The ranges and limitations provided in the instant specification and claims, are those which are believed to particularly point out and distinctly claim the present invention. It is, however, understood that other ranges and limitations which perform substantially the same function in the same or substantially the same manner to obtain the same or substantially the same results are intended to be within the scope of the instant invention.

Figure 2:
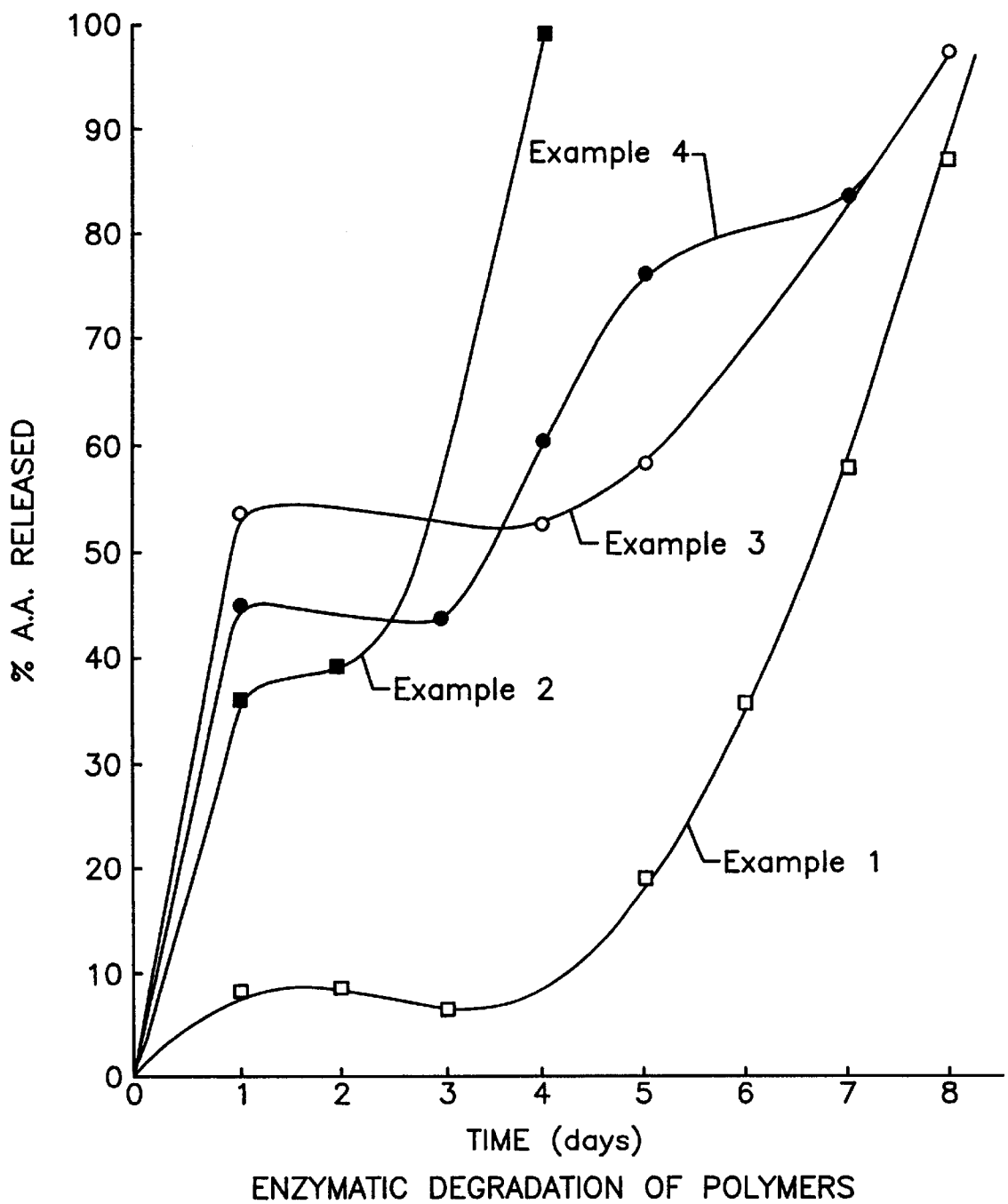

The process of the instant invention is described in detail with reference to the following drawings wherein:
FIG. 1 represents formula 1 of polymeric drugs.
FIG. 2 is a graphical representation of enzymatic degradation of polymers.

The invention is illustrated by the following examples which should not be construed to limit the scope of the invention in any manner.

EXAMPLE 1

This example describes die process for the preparation of polymer based on poly (ethylene glycol) and tyrosine and containing a drug in the side chain.

Preparation of poly (ethylene glycol) 6000-bis tyrosyl hydrochloride diester (PEG 6000-bis Tyr.HCl) (diester)

In a 100 ml capacity conical flask, 12 g PEG 6000 (0.002 M) 0.37 g (0.004 M) Tyr.HCl, and 20 ml DMF were taken. The contents of the flask were gently heated to dissolve the solids and obtain a clear solution. To this solution, 0.824 g DCC (0.004 M) dissolved in 10 ml DMF was added in a single portion. The reaction mixture was stirred at room temperature (25° C.) for 24 hours. It Was then filtered to separate out dicyclohexyl urea (DCU) formed and the clear solution was poured in 200 ml diethyl ether to precipitate out white powdery, product. The product was isolated and purified by reprecipitation from THF into petroleum ether. Yield (78%).

Preparation of poly (PEG 6000-bis Tyr.HCl-sebacate) (polymer).

In a 100 ml capacity conical flask 5 g PEG 6000-bis Tyr.HCl (containing 0.00148 moles of Tyr—OH groups), 0.15 g sebacic acid (containing 0.00148 moles of —COOH groups) and 10 ml DMF were placed. Contents of the flask were gently heated to obtain clear solution. To this solution 0.30 g DCC (0.00148 M) was added and the reaction mixture was stirred at room temperature for 24 hours. It was then filtered to remove DCU and the clear solution was poured in 100 ml diethyl ether to precipitate out the polymer. The polymer was purified by reprecipitation from DMF into diethyl ether.

Yield (68%).

Preparation of poly (PEG 6000-bis N-benzoyl tyrosyl-sebacate) (prodrug)

In a 100 ml capacity round bottom flask 2.5 g poly (PEG 6000-bis Tyr.HCl-sebacate) (containing 0.0006) moles of —$NH_2$ groups) and 20 ml THF was placed and stirred with magnetic needle. To this suspension 0.18 ml triethylamine (0.00126 M) was added. After stirring for few minutes; 0.073 ml benzoyl chloride (0.00063 M) dissolved in 5 ml THF was added and the reaction mixture was stirred 3 hours at room temperature. It was then filtered to remove triethylamine.hydrochloride and the clear solution was poured, in 200 ml petroleum ether to precipitate out the polymer. Polymer was purified by reprecipitation from THF into petroleum ether.

Yield (77%).

EXAMPLE 2

This example describes the process for the preparation of polymer based on poly (ethylene glycol) and cysteine and containing a drug in the side chain.

Preparation of poly (ethylene glycol) 6000-bis cystyl hydrochloride diester (PEG 6000-bis Cyst.HCl) (diester)

In a 100 ml capacity conical flask 12 g PEG 6000 (0.002 M) 0.62 g (0.004 M) Cyst.HCl, and 20 ml DMF were taken. The contents of the flask were gently heated to dissolve the solids and obtain a clear solution. To this solution 0.824 g DCC (0.004 M) dissolved in 10 ml DMF was added in a single portion. The reaction mixture was stirred at room temperature (25° C.) for 24 hours. It was then filtered to separate out dicyclohexyl urea (DCU) formed and the clear solution was poured in 200 ml diethyl ether to precipitate out white powdery product. The product was isolated and purified by reprecipitation from THF into petroleum ether.

Yield (80%).

Preparation of poly (PEG 6000-bis Cist HCl-sebacate) (polymer)

In a 100 ml capacity conical flask 5 g PEG 6000-bis Cyst.HCl (containing 0.002 moles of Cyst-SH groups), 0.20 g sebacic (containing 0.002 moles of—COOH groups) and 10 ml DMF were placed. Contents of the flask were gently heated to obtain clear solution. To this solution 0.412 g DCC (0.002 ) was added and the reaction mixture was stirred at room temperature for 24 hours. It was then filtered to remove DCU and the clear solution was poured in 100 ml diethyl ether to precipitate out the polymer. The polymer was purified by reprecipitadon from DMF into diethyl ether.

Yield (67%).

Preparation of poly (PEG 6000-bis N-benzoyl cystyl-sebacate) (prodrug)

In a 100 ml capacity round bottom flask 2.5 g poly (PEG 6000-bis Cyst.HCl-sebacate) (containing 0.0007 moles of —$NH_2$ groups) and 20 ml THF was placed and seed with magnetic needle. To this suspension 0.19 ml triethylamine (0.0014 M) was added. After stirring for few minutes 0.081 ml benzoyl chloride (0.0007 M) dissolved in 5 ml THF was added and the reaction mixture was stirred 3 hours at room temperature. It was then filtered to remove triethylamine.hydrochloride and the clear solution was poured in 200 ml petroleum ether to precipitate out the polymer. Polymer was purified by reprecipitation from THF into petroleum ether.

Yield (72%).

EXAMPLE 3

This example describes the process for the preparation of polymer based on poly (ethylene glycol) and serine and containing a drug in the side chain.

Preparation of poly (ethylene glycol) 6000-bis seryl hydrochloride diester (PEG 6000-bis Ser.HCl) (diester)

In a 100 ml capacity conical flask, 12 g PG 6000 (0.002 M), 0.56 (0.004 M) Ser.HCl, and 20 ml DMF were taken. The contents of the flash were gently heated to dissolve the solids and obtain a clear solution. To this solution, 0.824 g DCC (0.004 M) dissolved in 10 ml DMF was added in a singe portion. The reaction mixture was stirred at room temperature (25° C.) for 24 hours. It was then filtered to separate out dicyclohexyl urea (DCU) formed and the clear solution was poured in 200 ml diethyl ether to precipitate out white powdery product. The product was isolated and purified by reprecipitation from THF into petroleum ether.

Yield (88%).

Preparation of Poly (PEG 6000-bis Ser.HCl-sebacate) (polymer)

In a 100 ml capacity conical flask 5 g PEG 6000-bis Ser.HCl (containing 0.00152 moles of Ser-OH groups), 0.15 g sebacic acid (containing 0.00152 moles of —COOH groups) and 10 ml DMF were placed. Contents of the flask were gently heated to obtain clear solution. To this solution 0.313 g DCC (0.00152 M) was added and the reaction mixture was stirred at room temperature for 24 hours. It was then filtered to remove DCU and the clear solution was poured in 100 ml diethyl ether to precipitate out the polymer. The polymer was purified by reprecipitation from DMF into diethyl ether.

Yield (81%).

Preparation of Poly (PEG 6000-bis N-benzoyl seryl-sebacate) (prodrug)

In a 100 ml capacity round bottom flask, 2.5 g poly (PEG 6000-bis Ser.HCl-sebacate) (containing 0.0005 moles of —$NH_2$ groups) and 20 ml THF was placed and stirred with magnetic needle. To this suspension 0.14 ml triethylamine (0.001 M) was added. After stirring for few minutes 0.057 ml benzoyl chloride (0.0005 M) dissolved in 5 ml THF was added and the reaction mixture was stirred 3 hours at room temperature. It was then filtered to remove triethylamine.hydrochloride and the clear solution was poured in 200 ml petroleum ether to precipitate out the polymer. Polymer was purified by reprecipitation from THF into petroleum ether.

Yield (83%).

EXAMPLE 4

This example describes the process for the preparation of polymer based on poly (ethylene glycol) and threonine and containing a drug in the side chain.

Preparation of Poly (ethylene glycol) 6000-bis threonyl hydrochloride diester (PEG 6000-bis Thre.HCl) (diester)

In a 100 ml capacity conical flask, 12 g PEG 6000 (0.002 M), 0.57 g (0.004 M) Thre.HCl, and 20 ml DMF were taken. The contents of the flask were gently heated to dissolve the solids and obtain a clear solution. To this solution 0.824 g DCC (0.004 M) dissolved in 10 ml DMF was added in a single portion. The reaction mixture was stirred at room temperature (25° C.) for 24 hours. It was then filtered to separate out dicyclohexyl urea (DCU) formed and the clear solution was poured in 200 ml diethyl ether to precipitate out white powdery product. The product was isolated and purified by reprecipitation from life into petroleum ether.

Yield (84%).

Preparation of Poly (PEG 6000-bis Ser.HCl-sebacate) (polymer)

In a 100 ml capacity conical flask 5 g PEG 6000-bis Thre.HCl (containing 0.00178 moles of Ser-OH,groups), 0.179 g sebacic acid (containing 0.00178 moles of —COOH groups) and 10 ml DMF were placed. Contents of the flask were gently heated to obtain clear solution. To this solution 0.366 g DCC (0.00178 M) was added and the reaction mixture was steed at room temperature for 24 hours. It was then filtered to remove DCU and the clear solution was poured in 100 ml diethyl ether to precipitate out the polymer. The polymer was purified by reprecipitation from DMF into diethyl ether.

Yield (81%).

Preparation of Poly (PEG 6000 -bis N-benzoyl threonyl-sebacate) (prodrug)

In a 100 ml capacity round bottom flask, 2.5 g poly (PEG 6000-bis Thre.HCl-sebacate) (containing 0.00053 moles of —$NH_2$ groups) and 20 ml THF was placed and stirred with magnetic needle. To this suspension 0.15 ml triethylamine (0.0016 M) was added. After stirring for few minutes, 0.061 ml benzoyl chloride (0.00053 M) dissolved in 5 ml THF was added and the reaction mixture was stirred 3 hours at room temperature. It was then filtered to remove triethylamine-.hydrochloride and the clear solution was poured in 200 ml petroleum ether to precipitate out the polymer. Polymer was purified by reprecipitation from THF into petroleum ether.

Yield (76%).

EXAMPLE 5

This example describes the process for the preparation of polymer based on poly (ethylene glycol), tyrosine and itaconic acid and containing a drug in the side chain.

Preparation of Poly (ethylene glycol) 6000-bis tyrosyl hydrochloride diester (PEG 6000-bis Tyr.HCl) (diester)

Same as described in the Example 1.

Preparation of Poly (PEG 6000 bis Tyr.HCl-itaconate) (polymer)

In a 100 ml capacity conical flask 5 g PEG 6000-bis Tyr.HCl (containing 0.00148 moles of Tyr-OH groups), 0.085 g itaconic acid (containing 0.00148 moles of —COOH groups) and 10 ml DMF were placed. Contents of the flask were gently heated to obtain clear solution. To this solution 0.30 g DCC (0.00148 M) was added and the reaction mixture was stirred at room temperature for 24 hours. It was then filtered to remove DCU and the clear solution was poured in 100 ml diethyl ether to precipitate out the polymer. The polymer was purified by reprecipitation from DMF into diethyl ether.

Yield (60%).

Preparation of Poly (PEG 6000-bis N-benzoyl tyrosyl-itaconate) (prodrug)

In a 100 ml capacity round bottom flask. 25 g poly (PEG 6000-bis Tyr.HCl-itaconate) (containing 0.0008 moles of —$NH_2$ groups) and 20 ml THF was placed and stirred with magnetic needle. To this suspension 0.22 ml triethylamine (0.0016 M) was added. After stirring for few minutes, 0.092 ml benzoyl chloride (0.0008 M) dissolved in 5 ml THF was added and the reaction mixture was stirred 3 hours at room temperature. It was then filtered to remove triethylamine-.hydrochloride and the clear solution was poured in 200 ml petroleum ether to precipitate out the polymer. Polymer was purified by reprecipitation from THF into petroleum ether.

Yield (75%).

DEGRADATION STUDIES

In a stoppered test tube 1 g prodrug was dissolved in 10 ml 0.01 M phosphate buffer of pH 7.4. To this solution 0.1 g chymotrypsin was added and the solution was kept at 37° C. for 7 days. After every 24 hours 1 ml a liquor of the solution was taken out and Ninhydrin test was performed on it in order to estimate the amount of free amino acid liberated out due to polymer degradation.

Ninhydrin test was validated by performing two control tests. In one control only prodrug and in the second control only chymotrypsin was assayed for Ninhydrin test. In both the controls the test was negative. Only in the case of the solution of prodrug and chymotrypsin positive Ninhydrin test is observed. This shows that the polymer degradation is truly enzymatic.

Graph of free amino acids vs. time for all four examples is shown in FIG. 1. It is well known that only free amino acids give Ninhydrin test. Data shown in FIG. 1 show that chymotrypsin catalyzed the hydrolysis of ester bonds between PEG and amino acid, ester bond between amino acid and sebacic acid and amide bonds between benzoic acid and amino acid. Thus chymotrypsin exhibited pendant chain drug release as well as polymer backbone degradation for all the four examples.

TABLE 1

Enzymatic degradation studies

| | | Percentage degradation as monitored from the amount of free amino acid released | | | |
|---|---|---|---|---|---|
| No. | Polymer | Day 2 | Day 4 | Day 6 | Day 8 |
| 1 | Example 1 | 8% | 12% | 37% | 90% |
| 2 | Example 2 | 38% | 100% | | |
| 3 | Example 3 | 52% | 55% | 70% | 100% |
| 4 | Example 4 | 45% | 45% | 70% | 100% |

Data for these degradation studies are shown in Table 1. The degradation products of these polymers are poly (ethylene glycol), sebacic acid, amino acid and the drug molecule, which are known to be biocompatible. Therefore, these polymers have potential advantages in drug delivery system.

Also, due to the enzymatic mode of degradation depending upon the amino acid present in the polymer, the degradation of polymers will vary with the specificity of enzymes. Thus, these polymers additionally could provide site specific drug delivery system.

Advantages of the Present Invention are as Follows:

1) The process of the present invention completely eliminates the use of conventional —$NH_2$ group blocking reagents such as benzylchloroformate and tertiary butyloxycarbonyl chloride. The process of the present invention uses commonly available hydrochloride salts of amino acids for the protection of —$NH_2$ groups. Thus, the drug linkage to the amino groups in the side chain of the polymers can be easily effected by neutralization of the hydrochloride salt. This is certainly advantageous over the conventional de-blocking method of hydrogenation or the reaction of the —Ncbz groups containing polymer with 1,4 cyclohexadiene and Palladium/activated charcoal.

2) The process of the present invention is generally applicable for the synthesis of polymers based on various amino acids as can be seen from the examples listed herein above.
3) Degradation products of the polymers so synthesized are known to be biocompatible.

What is claimed is:

1. A process for preparing enzymatically degradable polymers, having repeating structural unit represented by the formula below:

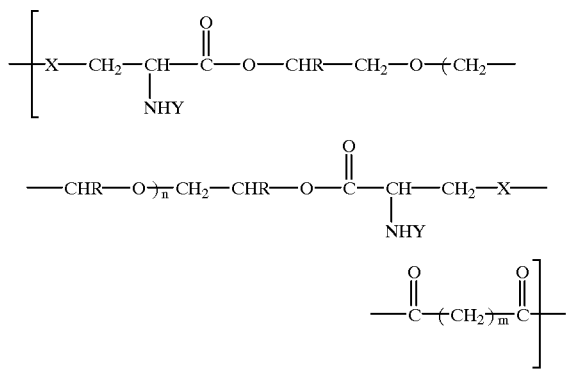

wherein

X—is an amino acid residue selected from the group consisting of tyrosine, serine, threonine and cysteine, Y—is a pendant group selected from drug molecules containing carboxyl groups, R—is selected from the group consisting of hydrogen, methyl and a mixture of hydrogen and methyl on the individual molecule, n—is an integer from 0 to about 100, and m—is an integer from 0 to 10, comprising:

(i) reacting a diester of poly(oxyalkylene glycol) and hydrochloride of trifunctional amino acid with a dicarboxylic acid in the presence of a condensing agent in a solvent at a temperature in the range of 0° C. to room temperature for a period ranging between 1 hr to 24 hrs, (ii) neutralizing the hydrochloride salt by base, (iii) reacting the free amino groups in the side chain of the polymer with the drug molecule containing carboxyl groups to obtain an enzymatically degradable polymer.

2. The process according to claim 1, wherein the poly (oxyalkylene glycol) is selected from the group consisting of compounds of the formula HO—CH$_2$—CHR—O—(CH$_2$—CHR—O)$_n$CH$_2$—CHR—OH wherein n is an integer which represents the average number of oxyethylene groups.

3. The process according to claim 1, wherein the glycol is selected from the group consisting of compounds having formula HO—(CH$_2$)$_l$—OH, wherein l is an integer from 0 to 12.

4. The process according to claim 1, wherein the hydrochlorides of the amino acids are prepared by treating the amino acids with hydrochloric acid.

5. The process according to claim 1, wherein the dicarboxylic acid is selected from the group consisting of compounds having the formula HOOC—(CH$_2$)$_m$—COOH wherein m is an integer from 0 to 10.

6. The process according to claim 1, wherein the dicarboxylic acid is unsaturated and is selected from the group consisting of itacoinc acid and fumaric acid.

7. The process according to claim 1, wherein the condensing agent is selected from the group consisting of carbodiimides comprising dicyclohexyl carbodiimide and diisopropyl carbodiimide.

8. The process according to claim 1, wherein the solvent is selected from the group consisting of acetonitrile, tetrahydrofuran, dioxane and dimethylformamide.

9. The process according to claim 1, wherein the base is selected from the group consisting of triethylamine, tributylamine and sodium bicarbonate.

10. The process according to claim 1, wherein the pendant Y group comprises drug molecules containing carboxyl group.

11. The process according to claim 1, wherein the drug molecules comprise benzoic acid, methotrexate and mixtures thereof.

12. An enzymatically degradable polymer prepared according to the process as claimed in any one of claims 1 to 11.

13. The process according to claim 1, wherein n is an integer from 0 to 100.

* * * * *